UNITED STATES PATENT OFFICE.

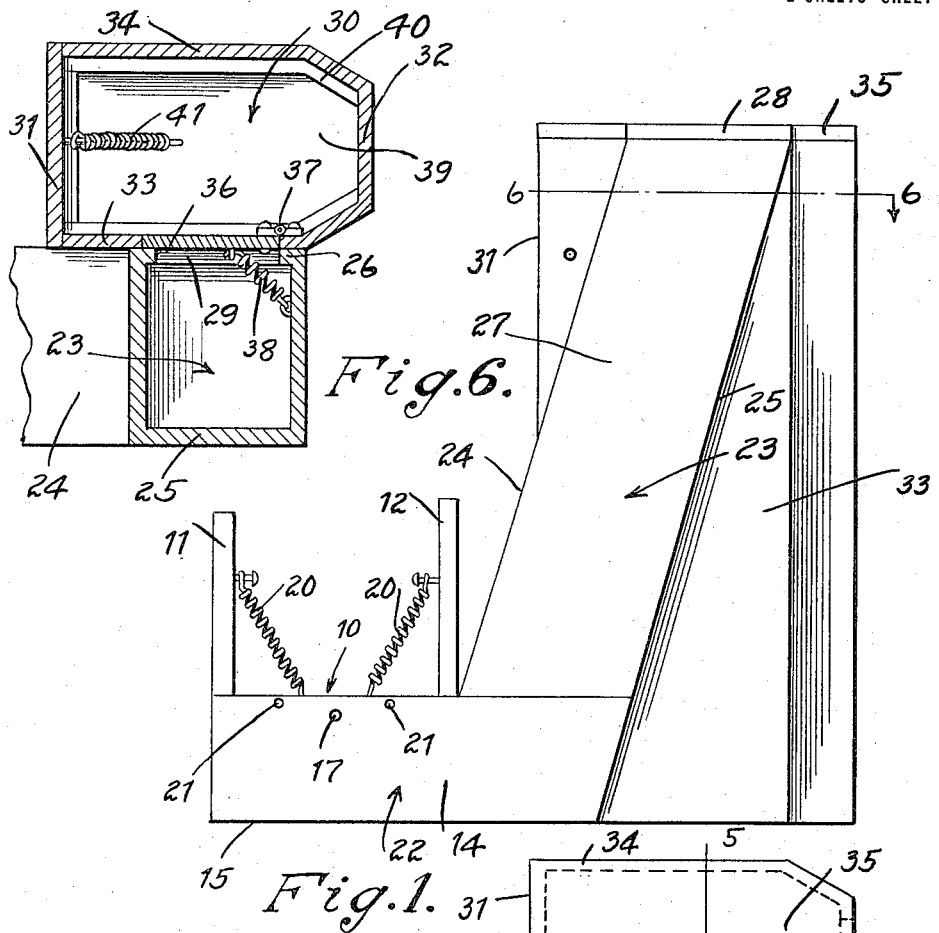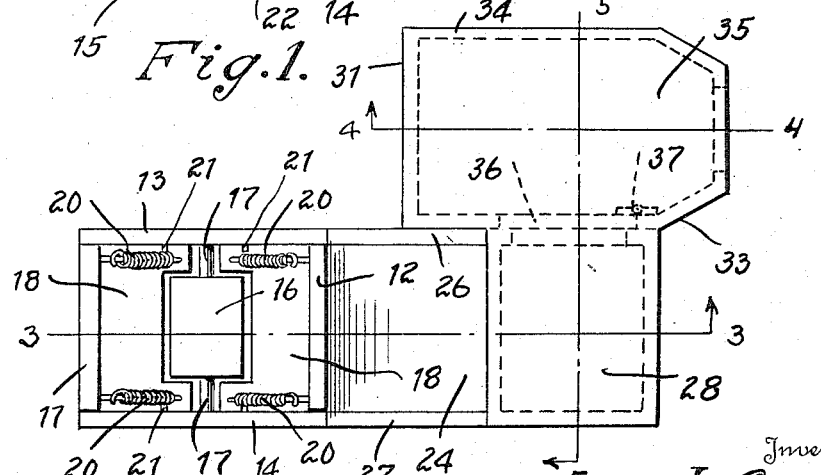

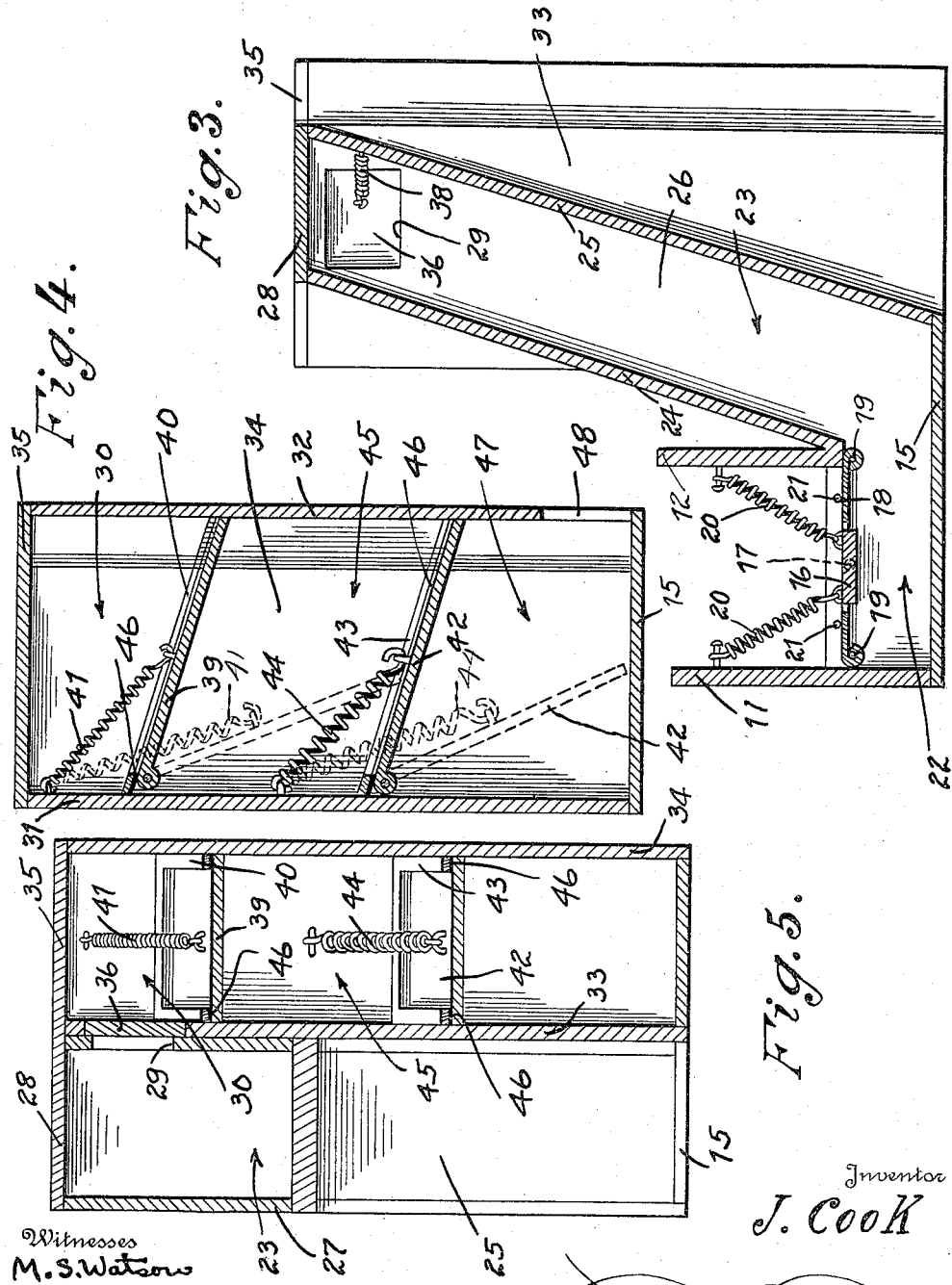

JIM COOK, OF SWINK, OKLAHOMA, ASSIGNOR OF ONE-FOURTH TO J. M. AND J. E. HERD, ONE-FOURTH TO A. D. AND ALLEN TALLIE, AND ONE-FOURTH TO A. D. TALLIE, ALL OF SWINK, OKLAHOMA.

RAT-TRAP.

1,163,587.

Specification of Letters Patent.

Patented Dec. 7, 1915.

Application filed June 12, 1914. Serial No. 844,711.

*To all whom it may concern:*

Be it known that I, JIM COOK, a citizen of the United States, residing at Swink, in the county of Choctaw, State of Oklahoma, have invented certain new and useful Improvements in Rat-Traps; and I do hereby declare the following to be a full, clear, and exact description of the invention, such as will enable others skilled in the art to which it appertains to make and use the same.

This invention relates to trapping devices, particularly to a trap for rats, mice and the like, and has for its object the provision of a novel device whereby rats will be caught and smothered therein until removed from the trap by the operator.

An important object is the provision of a trap of this character which avoids the use of bait and operates on the plan of a pitfall.

Other objects and advantages such as simplicity, cheapness in manufacture, efficiency in service and the general improvement of the art, will be carefully brought out in the following description and illustrated in the accompanying drawings, in which—

Figure 1 is a side elevation of the trap, Fig. 2 is a top plan view, Fig. 3 is a vertical sectional view on the line 3—3 of Fig. 2. Fig. 4 is a vertical sectional view on the line 4—4 of Fig. 2, Fig. 5 is a vertical sectional view on the line 5—5 of Fig. 2, and Fig. 6 is a horizontal sectional view on the line 6—6 of Fig. 1.

Referring more particularly to the drawing my device comprises a pitfall portion which may be preferably associated with a run way for leading the rats to the trap. The pitfall portion comprises front and back walls 11 and 12 and side walls 13 and 14 secured upon a bottom 15. Revolubly mounted between the side walls 13 and 14 is a platform 16 provided upon its ends with trunnions 17 journaled through the side walls. Plates 18 are hingedly secured as at 19 upon the front and back walls 11 and 12 and have their free edges conforming to and disposed adjacent the sides of the revoluble platform 16. The platform 16 is weighted so that it will normally be disposed in a horizontal position. The plates 18 are normally held in a horizontal position alined with the platform 16 by means of coil springs 20 connected adjacent their free edges and connected with the front and back walls 11 and 12, and are prevented from undesired upward movement by stops 21. When the rat steps upon either the platform 16 or the plates 18 these members will swing downwardly and cause the rat to fall into the space 22 inclosed by the walls 11, 13 and 14. An upwardly inclined inclosed runway 23 communicates with the space 22 and comprises front and back walls 24 and 25 and side walls 26 and 27 connected at their lower ends with the bottom 15. The top of the runway 23 is closed by a plate 28 and its side wall 26 is provided with an opening 29 communicating with a vertically disposed chamber 30 formed by front and back walls 31 and 32 and side walls 33 and 34 and provided with a top 35. After the rat has fallen in the chamber 22 he will ascend through the inclined runway 23 and will pass through an outwardly swinging trap door 36 hingedly secured as at 37 upon the side 33 and normally closed by a coil spring 38 secured to the edge of the door 36 and to the wall 32 of the run way. Disposed within the chamber 30 is a downwardly swinging trap door 39 normally held in its uppermost position engaging stops 40 by a coil spring 41. Disposed below and spaced from the trap door 39 is a similar trap door 42 normally held in its uppermost position against stops 43 by a coil spring 44. When the rat passes through the trap door 36 he will fall upon the trap door 39 which will give way and let him fall into the space 45 between the trap door 39 and the trap door 42. The spring 41 is sufficiently light that the trap door 39 will give way under the weight of one rat whereas the spring 44 is sufficiently heavy that it will require the weight of several rats to open the trap door 42. After the rats or mice collect within the chamber 45 they will be smothered in view of the fact that the trap doors 39 and 42 fit snugly against rubber packing 46 disposed upon the lower sides of the abutment strips 40 and 43. After a considerable number of rats have been suffocated in this air tight chamber 45, their weight will be sufficient to pull the trap door 42 downwardly against the resistance of the strong spring 44 and allow the rats to fall into the space 47 below the trap door 42 from which they may be removed through an opening 48 in the wall 32. The rats do not follow into the said compartment 45 in rapid succession, therefore each rat will consume the oxygen let into the compartment 45 by his entrance into the same before the advent of the next rat under ordinary conditions. So far as all of the rats except the one which operates the platform 42 are concerned they will be killed in the chamber 45 by suffocation. For instance when four rats are resting upon the platform 42 these rats will be dead. Now as the fifth rat enters the compartment 30 the platform 39 is operated and the end of the platform pushes downwardly upon the bodies of the dead rats in the compartment 45. At this time it will be natural for the rat in the compartment 30 to attempt to climb upwardly on the platform 39 as it is the tendency for an animal to climb thus under these conditions. At this time the lower end of the platform 39 bears against the bodies of the dead rats in the compartment 45 and pushes the platform 42 downwardly. When this platform 42 reaches such position that the rats will be precipitated therefrom, these rats of course drop into the compartment 47 and at this time the angle of inclination of the platform 39 is such that the fifth rat will drop into the compartment 45. However, the precipitation of the rats from the platform 42 requires but an instant and therefore the spring 44 will return the platform 42 to its initial position before the fifth rat reaches the position of the platform and consequently the said fifth rat will be maintained in the compartment 45.

It will be readily understood that the device may be made preferably of some such material as galvanized iron or wood lined with tin or sheet iron so that the rats cannot gnaw through any part of the device. It is absolutely essential that the chamber 45 be formed positively air-tight so that rats will be smothered in a very short time.

From the foregoing description and a study of the drawing it will be apparent that I have thus provided a simple and efficient trap for catching rats and mice which will be positive in operation, quick in action and self-controlling.

It will be readily understood that I reserve the right to make various changes in the form, construction and arrangement of parts as will not depart from the spirit of the invention or limit the scope of the subjoined claims.

Having thus described my invention, I claim:

1. A trap comprising a horizontal casing, a revoluble trap door journaled in said casing and forming the top thereof, a runway communicating with said casing, a second casing communicating with said runway, a spring closed trap door disposed between said runway and said second named casing at their point of communication, and a pair of spaced downwardly opening trap doors hinged within said second named casing and forming with said casing an air tight chamber, the lowermost of said pair of trap doors being openable by the weight of a plurality of rats to deposit said rats within the bottom of said second named casing.

2. A trap comprising a horizontal casing, spring pressed plates hinged within said casing, a revoluble plate journaled in said casing and forming with said plates the top of the casing, a runway communicating with said casing, a second casing communicating with said runway, a spring closed trap door disposed between said runway and said second named casing at their point of communication, a pair of spaced downwardly opening trap doors hinged within said second named casing, abutment strips within said second named casing engaged by said trap doors for limiting their upward movement, and rubber packing on said strips for forming an air tight closure, the spring of said upward trap door allowing said upward trap door to open under the weight of one rat and the spring of said lower trap door being openable by the weight of a plurality of rats.

In testimony whereof I affix my signature, in the presence of two witnesses.

JIM COOK.

Witnesses:
J. E. HERD,
A. D. TALLY.

Copies of this patent may be obtained for five cents each, by addressing the "Commissioner of Patents, Washington, D. C."